US010915913B2

(12) United States Patent
Gandhi

(10) Patent No.: US 10,915,913 B2
(45) Date of Patent: *Feb. 9, 2021

(54) DATA STRUCTURES FOR CATEGORIZING AND FILTERING CONTENT

(71) Applicant: PAYPAL, INC., San Jose, CA (US)

(72) Inventor: Saumil Gandhi, Sunnyvale, CA (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/601,114

(22) Filed: Oct. 14, 2019

(65) Prior Publication Data
US 2020/0118149 A1 Apr. 16, 2020

Related U.S. Application Data

(63) Continuation of application No. 14/983,843, filed on Dec. 30, 2015, now Pat. No. 10,445,755.

(51) Int. Cl.
H04L 29/06 (2006.01)
H04L 29/08 (2006.01)
H04L 12/26 (2006.01)
H04L 12/58 (2006.01)
G06F 3/0481 (2013.01)
G06Q 30/02 (2012.01)
G06F 16/9535 (2019.01)

(52) U.S. Cl.
CPC ..... *G06Q 30/0206* (2013.01); *G06F 16/9535* (2019.01); *H04L 67/02* (2013.01); *H04L 67/42* (2013.01)

(58) Field of Classification Search
CPC ... H04L 43/028; H04L 67/42; H04L 67/1097; H04L 43/08; H04L 69/22; H04L 67/36
USPC ........................................................ 709/203
See application file for complete search history.

(56) References Cited

U.S. PATENT DOCUMENTS

| | | | |
|---|---|---|---|
| 9,032,289 B1* | 5/2015 | Cierniak | G06F 16/9558 715/255 |
| 10,739,938 B2* | 8/2020 | Bastide | G06F 16/9535 |
| 2002/0016954 A1 | 2/2002 | Charisius et al. | |
| 2004/0205649 A1 | 10/2004 | Chakmakian | |
| 2007/0115256 A1 | 5/2007 | Lee et al. | |
| 2007/0162308 A1 | 7/2007 | Peters | |
| 2008/0191878 A1 | 8/2008 | Abraham | |
| 2010/0095211 A1 | 4/2010 | Kenvin et al. | |
| 2011/0093520 A1 | 4/2011 | Doyle et al. | |
| 2011/0154192 A1 | 6/2011 | Yang et al. | |
| 2011/0173176 A1 | 7/2011 | Christensen et al. | |
| 2012/0030047 A1 | 2/2012 | Fuentes et al. | |
| 2012/0066264 A1 | 3/2012 | Shaked et al. | |
| 2012/0158753 A1 | 6/2012 | He et al. | |

(Continued)

*Primary Examiner* — David R Lazaro
*Assistant Examiner* — Berhanu Shitayewoldetadik
(74) *Attorney, Agent, or Firm* — Haynes and Boone, LLP

(57) ABSTRACT

Methods, systems, and computer program products are included for categorizing and filtering content. A comment is stored in one or more data structures. The one or more data structures are modified to associate the comment with a tag and a password. The amount of comments that are associated with the tag are determined and compared with a threshold amount of comments. Based on the amount of comments exceeding the threshold, access is restricted to the comments that are associated with the tag.

20 Claims, 7 Drawing Sheets

(56) References Cited

U.S. PATENT DOCUMENTS

| | | | |
|---|---|---|---|
| 2012/0265806 A1* | 10/2012 | Blanchflower | H04L 51/32 |
| | | | 709/204 |
| 2013/0117353 A1 | 5/2013 | Wong et al. | |
| 2013/0205197 A1 | 8/2013 | O'Neill | |
| 2014/0068074 A1* | 3/2014 | Goyal | G06F 21/6218 |
| | | | 709/225 |
| 2014/0074855 A1 | 3/2014 | Zhao et al. | |
| 2014/0304250 A1 | 10/2014 | Sankar et al. | |
| 2016/0301650 A1 | 10/2016 | Oztaskent et al. | |
| 2017/0054528 A1 | 2/2017 | Pedersen et al. | |
| 2018/0246983 A1* | 8/2018 | Rathod | G06F 16/9535 |
| 2019/0098054 A1* | 3/2019 | Ramachandran | H04L 63/20 |
| 2019/0132393 A1* | 5/2019 | Ring | G06F 9/547 |
| 2019/0272328 A1* | 9/2019 | Dubyak | G06F 16/35 |

* cited by examiner

DATA STRUCTURES FOR CATEGORIZING AND FILTERING CONTENT

CROSS-REFERENCE TO RELATED APPLICATIONS

This application is a continuation of U.S. patent application Ser. No. 14/983,843, filed Dec. 30, 2015, which is herein incorporated by reference in its entirety.

BACKGROUND

Field of the Invention

The present disclosure generally relates to data processing performed on networked computing devices. In particular, the present disclosure relates to methods and systems for categorizing and filtering content that is transmitted to computing devices.

Related Art

Conventional data processing techniques allow users to post content to other users. For example, users may post comments, articles, and other content to social media sites, online bulletin boards, news sites, and so forth. Some content may be more desirable to users than other content. While traditional online content filtering techniques have been generally adequate for filtering some content, limitations still remain. For example, with traditional filtering techniques, users may still receive content that is unwanted. Therefore, a need exists to further improve content filtering.

BRIEF DESCRIPTION OF THE DRAWINGS

The present invention is illustrated by way of example and not limitation in the figures of the accompanying drawings.

DETAILED DESCRIPTION

Figure 1:
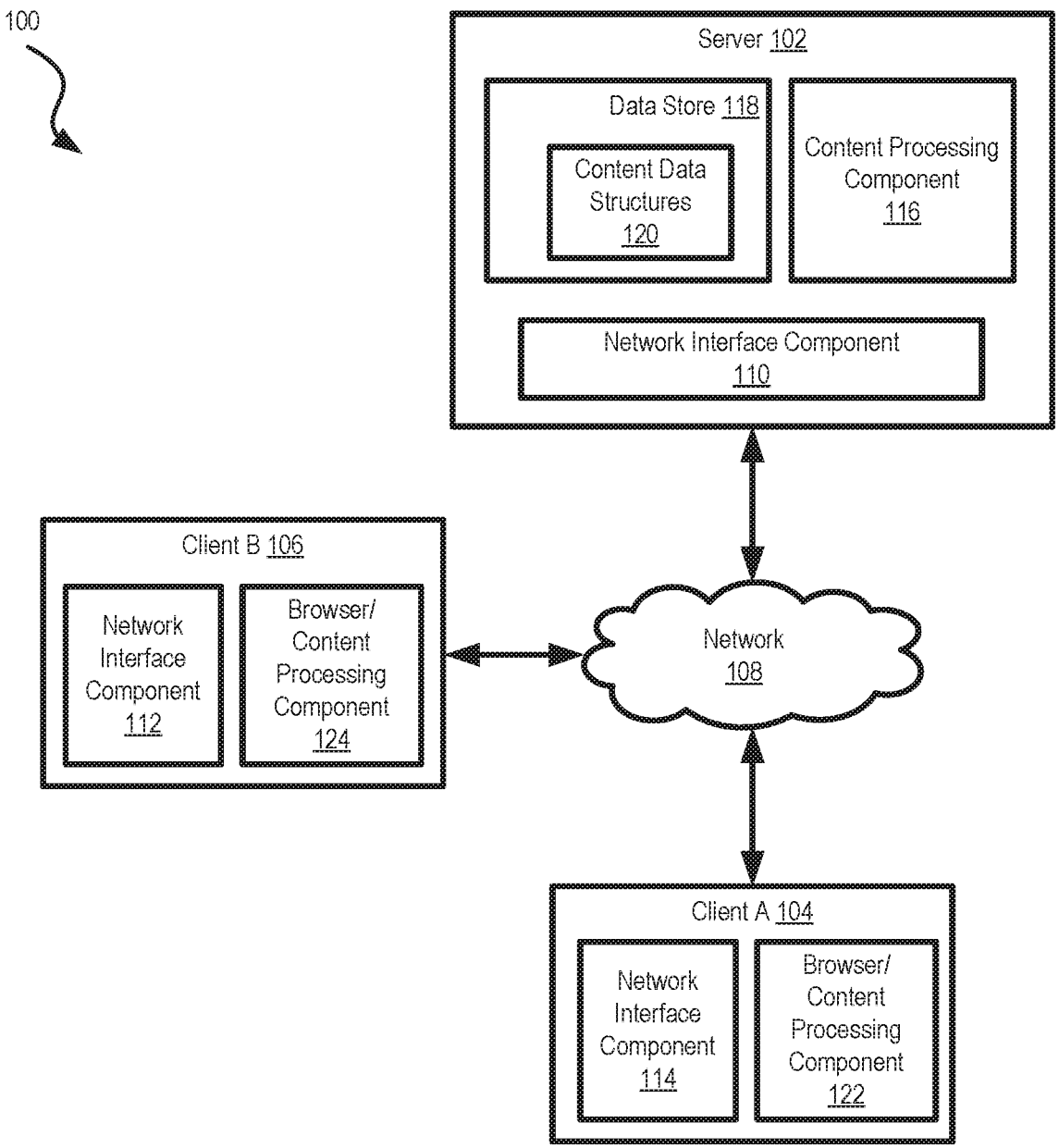
FIG. 1 is a block diagram illustrating a content categorizing and filtering system architecture, in accordance with various examples of the present disclosure.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

According to the various aspects of the present disclosure, a method, system, and computer program product are discussed that allow for categorizing and filtering content. In some examples, a user may include a tag and a password in a comment that is posted to a social networking site. Other comments, such as responses to the comment, may be posted by the same user or other users that also include the tag. When an amount of comments that include that tag reaches a threshold, access may be restricted to users that provide the password. Accordingly, popular discussions may be identified and monetized. For example, a site may charge fees to users for accessing the popular content.

According to the various aspects of the present disclosure, a method, system, and computer program product are discussed that provide comment filtering based on the tags, such as by performing searches using keywords and matching the keywords to tags. Tags may be displayed with additional information, such as the amount of comments that include the tag and prices to access the comments associated with the tag. Users may select a tag and be provided with a payment interface to purchase access to the password corresponding to the comments associated with the tag. After a payment indicator is received, the password is provided so that a user may access the comments.

According to the various aspects of the present disclosure, a method, system, and computer program product are discussed for packaging one or more content data structures into a content payload. Each content data structure in the content payload may be associated with a tag. The content payload may be transmitted to client computing devices. Each client computing device may have client information that indicates client preferences. These preferences are matched to the tags in the content payload to determine appropriate content for each client. For example, client information may include a client location. A content data structure may include a tag that matches the user location. Accordingly, upon determining that the tag is a match, content may be presented corresponding to a particular content data structure of the content payload.

Various aspects of the present disclosure may provide advantages over conventional content filtering techniques. For instance, users may benefit by the ability to charge other users fees for accessing their comments. Users may also benefit by filtering the comments based on the tags to customize the content that is presented. Further, packaged content may be delivered to a plurality of users and filtered for each user to enhance the users' experience with the content.

FIG. 1 illustrates a content categorizing and filtering system architecture 100, in accordance with various examples of the present disclosure. System architecture 100 includes a server 102, a client A 104, and a client B 106. The server 102, client A 104, and client B 106 are each structured as a computing device. A computing device may include, for example, a rack mount server, desktop computer, laptop computer, tablet, smart phone, or other computing device.

While in the present example a single server and two clients are illustrated, in other examples there may be additional servers and clients. Further, servers and clients may each comprise a plurality of computing devices. For example, the server 102 may include a cluster of server computing devices. In addition, the computing devices may be structured in other configurations besides client/server. For example, the computing devices may be structured as peers in a peer-to-peer network.

In the present example, the server 102, client A 104, and client B 106 are communicatively coupled via a network 108. The network 108 may include any combination of public and/or private networks. The network 108 may include one or more network devices that are communicatively coupled via transport media to communicate signals between the server 102, client A 104, and/or client B 106. In some examples, network devices include routers, hubs, switches, and so forth. In some examples, transport media include Ethernet cable, Fibre Channel Cable, wireless signals, and so forth. The server 102, client A 104, and client B 106 may each include a network interface component (e.g., network interface components 110, 112, and 114) that is structured to communicatively couple the computing devices to the network 108. A network interface component may include, for example, a network interface card or other hardware and/or software component that allows a computing device to connect to the network 108.

In the present example, the server 102 includes a content processing component 116. In some examples, the content processing component 116 is structured to receive content from the browser/content processing components 122 and 124 of client A 104 and client B 106, respectively. For example, content processing component 116 may receive content such as comments corresponding to social networking activities, articles, news postings, and so forth. The content processing component 116 is also structured to associate information with the content. In some examples, the information includes tags and passwords corresponding to the content.

In the present example, the content processing component 116 is structured to store the content and information corresponding to the content in a data store 118. In some examples, the data store 118 is structured to store one or more content data structures 120, which may include all or portions of relational databases, flat files, web services, and so forth. These content data structures 120 may be homogenous or heterogeneous (e.g., a first content data structure may be an SQL-compliant database and a second content data structure may be a web service). In some examples, the content data structures 120 are structured as rows and columns of a relational database. In other examples, the content data structures 120 are structured as text in a flat file that includes markup to structure the content. For example, special characters, delimiters, and/or other data (e.g., XML markup) may be included in the text to structure the content. In yet other examples, the content data structures 120 may include one or more classes and/or objects that are structured to store content such as comments, articles, reviews, and so forth. In addition, the content data structures 120 may associate information such as tags and/or passwords with the content, such that the content may be categorized and filtered. Some examples of particular data structures that may be included in the data store 118 are illustrated and described with respect to FIGS. 3A, 3B, 4, and 5.

Content processing component 116 is structured to filter content stored in the data store 118, such that filtered information may be retrieved from the data store 118 and transmitted to client A 104 and/or client B 106 via the network interface component 110 and network 108. Some examples of techniques for filtering content and providing the content to clients are illustrated and described with respect to FIGS. 6, 7, and 8.

Turning now to client A 104 and client B 106, each client is structured with a browser and/or other content processing component (e.g., browser/content processing components 122 and 124). In some examples, each browser/content processing component 122 and 124 is structured as a web browser or other application that may input data from a user and/or present data to a user via a display. In some examples, each browser/content processing component 122 and 124 is structured to display comments, input search queries corresponding to comments, select tags corresponding to comments, input payment information, received passwords to access selected tags, start discussions by entering new comments, and/or reply to comments by other users. In some examples, the each browser/content processing component 122 and 124 is structured to process content received from the server 102 to match client information with tags included in the content, to selectively present portions of the content to users. Some examples of techniques for interacting with content by the clients are illustrated and described with respect to FIGS. 6, 7, and 8.

Figure 2:
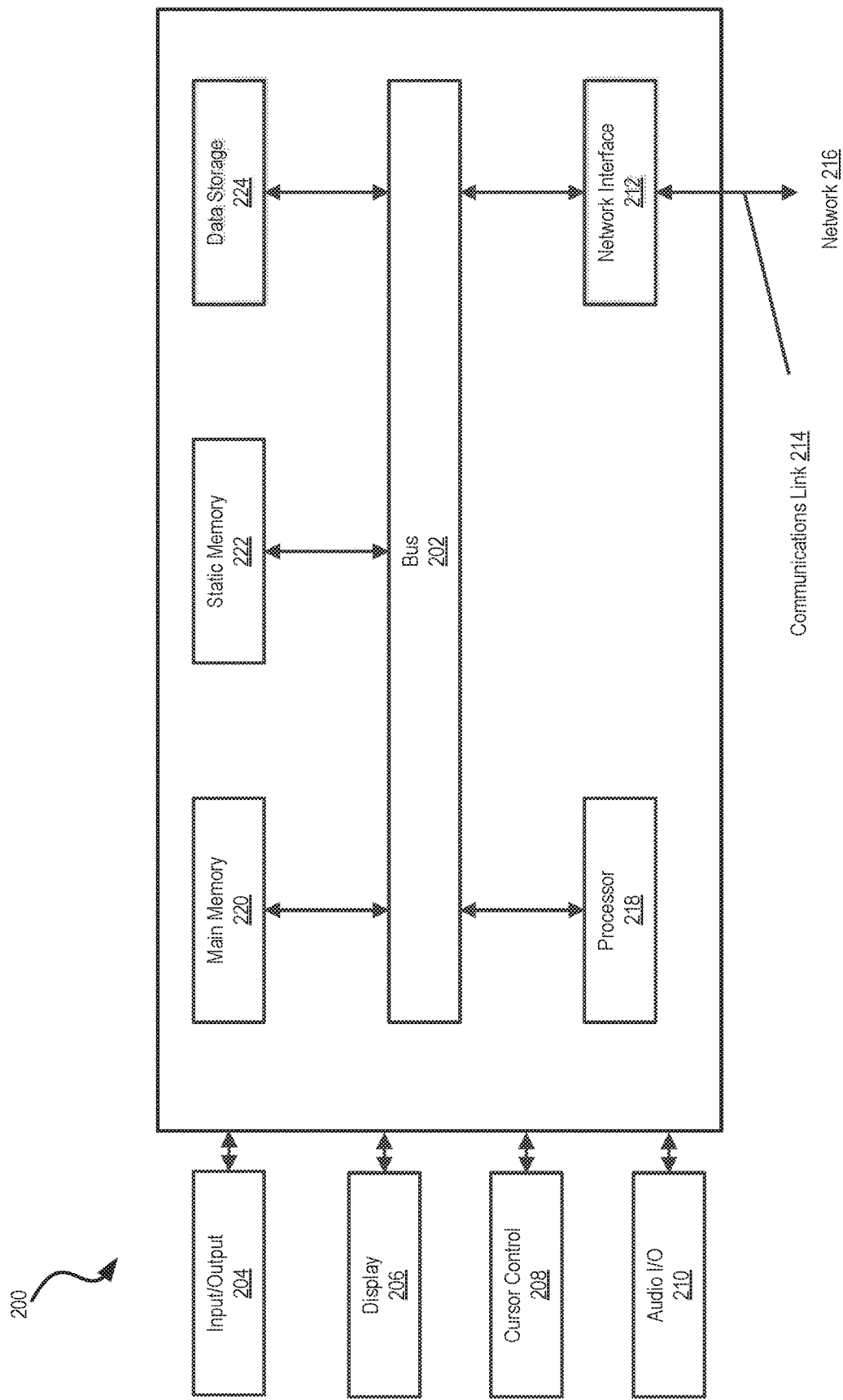
FIG. 2 is a block diagram illustrating a computer system suitable for implementing one or more computing devices.

FIG. 2 illustrates a computer system 200 suitable for implementing one or more computing devices of a computing system (e.g., computing system 100). In various implementations, computer system 200 may provide a computing device, such as a smart or mobile phone, a computing tablet, a desktop computer, laptop, wearable device, rack mount server, or other computing device.

Computer system 200 may include a bus 202 or other communication mechanisms for communicating information data, signals, and information between various components of computer system 200. Components include an I/O component 204 that processes a user action, such as selecting keys from a keypad/keyboard, selecting one or more buttons, links, actuatable elements, etc., and sends a corresponding signal to bus 202. I/O component 204 may also include an output component, such as a display 206 and a cursor control 208 (such as a keyboard, keypad, mouse, touch screen, etc.). An optional audio I/O component 210 may also be included to allow a user to hear audio and/or use voice for inputting information by converting audio signals.

A network interface 212 transmits and receives signals between computer system 200 and other devices, such as user devices, data storage servers, payment provider servers, and/or other computing devices via a communications link 214 and a network 216 (e.g., such as a LAN, WLAN, PTSN, and/or various other wired or wireless networks, including telecommunications, mobile, and cellular phone networks).

The processor 218 represents one or more general-purpose processing devices such as a microprocessor, central processing unit, or the like. More particularly, processor 218 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 108 may also be one or more special-purpose processing devices such as an application specific integrated circuit (ASIC), a field programmable gate array (FPGA), a digital signal processor (DSP), network processor, or the like. Processor 218 is configured to execute instructions for performing the operations and steps discussed herein.

Components of computer system 200 also include a main memory 220 (e.g., read-only memory (ROM), flash memory, dynamic random access memory (DRAM) such as synchronous DRAM (SDRAM), double data rate (DDR SDRAM), or DRAM (RDRAM), and so forth), a static memory 222 (e.g., flash memory, static random access memory (SRAM), and so forth), and a data storage device 224 (e.g., a disk drive).

Computer system 200 performs specific operations by processor 218 and other components by executing one or more sequences of instructions contained in main memory 220. Logic may be encoded in a computer readable medium, which may refer to any medium that participates in providing instructions to processor 218 for execution. Such a medium may take many forms, including but not limited to, non-volatile media, volatile media, and/or transmission media. In various implementations, non-volatile media includes optical or magnetic disks, volatile media includes dynamic memory, such as main memory 220, and transmission media between the components includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 214 to the network 216 may perform instruction sequences to practice the present disclosure in coordination with one another. Modules described herein may be embodied in one or more computer readable media or be in communication with one or more processors to execute or process the steps described herein.

Figure 3A:
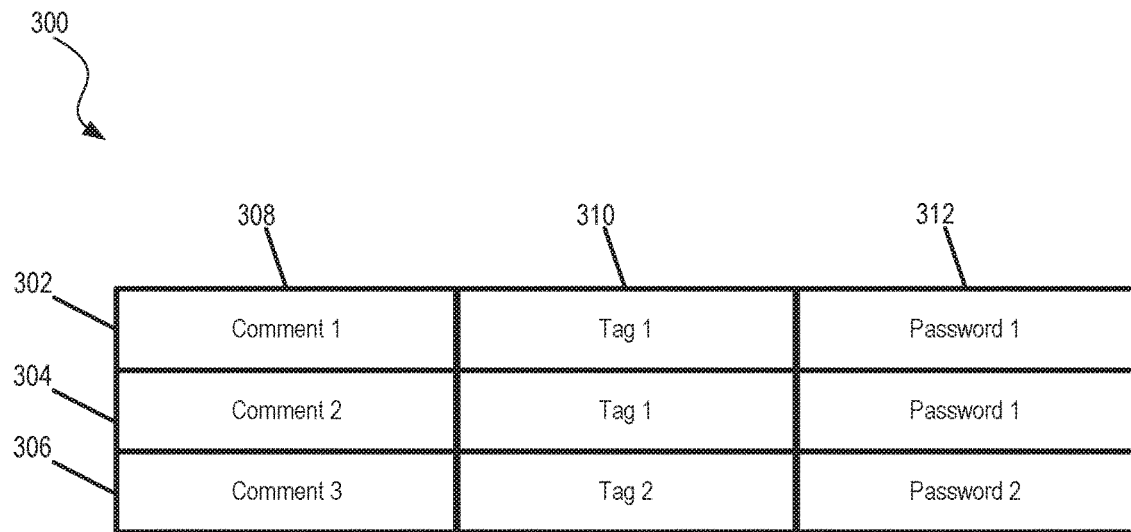
FIG. 3A is a data structure diagram illustrating a data structure for associating data corresponding to comments, tags, and passwords, in accordance with various examples of the present disclosure.

FIG. 3A illustrates a data structure 300 for associating data corresponding to comments, tags, and passwords, in accordance with various examples of the present disclosure.

In the present example, the data structure 300 is structured as a table that includes a plurality of rows and columns that associate data with other data. In some examples, the data structure 300 is included as a table of a relational database. In other examples, the data structure 300 may include one or more tables that each include one or more comments, tags, and/or passwords.

In the present example, the data structure 300 is structured to include a comment column 308 that is structured to store comments. Comments may include, for example, text data or other data submitted by users for posting online (e.g., to websites, social media sites, and so forth). The data structure 300 is structured to include a tag column 310 and a password column 312. The tag column 310 is structured to include tags, which may be groups, keyword descriptions corresponding to content, or other categorizations. The password column 312 is structured to include passwords. In some examples, the comments, tags, and/or passwords are structured as alphanumeric strings, which may also include special characters.

In the present example, the data structure 300 is structured to include a first row 302, a second row 304, and a third row 306. The rows 302, 304, and 306 are structured to associated data corresponding to the columns 308, 310, and 312. For example, Comment 1 is associated with Tag 1 and Password 1 by being included in a same row 302. Similarly, Comment 2 is associated with Tag 2 and Password 2 by being included in a same row 304; Comment 3 is associated with Tag 3 and Password 3 by being included in a same row 306.

In other examples, various table data structure configurations may be used to store the comment, tag, and/or password data. For example, in some configurations, comments, tags, and/or passwords may be associated by being included in a same column. In other examples, entries in a table may be associated with entries in one or more other tables.

Figure 3B:
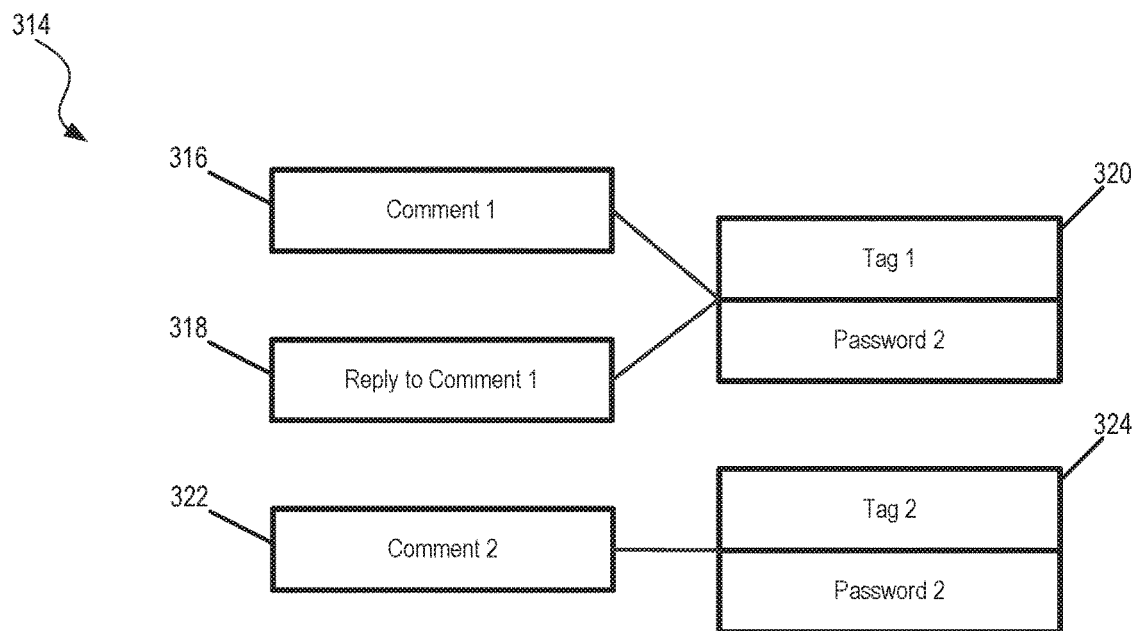
FIG. 3B is a data structure diagram illustrating a data structure for associating data corresponding to comments, tags, and passwords, in accordance with various examples of the present disclosure.

FIG. 3B illustrates a data structure 314 for associating data corresponding to comments, tags, and passwords, in accordance with various examples of the present disclosure.

In the present example, the data structure 314 is structured to include a plurality of objects, which in some examples represent instances of classes.

In the present example, a first comment object 316 is associated with a first metadata object 320, which includes tag and password metadata corresponding to the first comment object 316. In some examples, the first comment object 316 is structured to include a text variable that stores text corresponding to a comment submitted by a client. In some examples, the first metadata object 320 is structured to include a text variable that stores text corresponding to a tag and a password that are submitted by the client. While in this example the tag and password are illustrated as a metadata object 320, in other examples the tag and password may be structured as separate objects.

In the present example, a second comment object 318 is associated with the first metadata object 320. In some examples, the second comment object 318 is structured to include text corresponding to a reply to the text included in the first comment object 316. Accordingly, the second comment object 318 may be associated with a same metadata object 320 as the first comment object 316.

In the present example, a third comment object 322 is associated with a second metadata object 324. In some examples, the third comment object 322 is structured to include a text variable that stores text corresponding to a comment submitted by a client. In some examples, the second metadata object 324 is structured to include a text variable that stores text corresponding to a tag and a password that are submitted by the client. While in this example the tag and password are illustrated as a metadata object 324, in other examples the tag and password may be structured as separate objects.

In the present example, the comment objects 316, 318, and 322 may be associated with the tag and password data included in the metadata objects 320 and 324 in various ways. For example, comment objects may be structured to include pointers or other references to metadata objects. In another example, comment objects may include variables corresponding to metadata objects, tags, and/or passwords.

Figure 4:
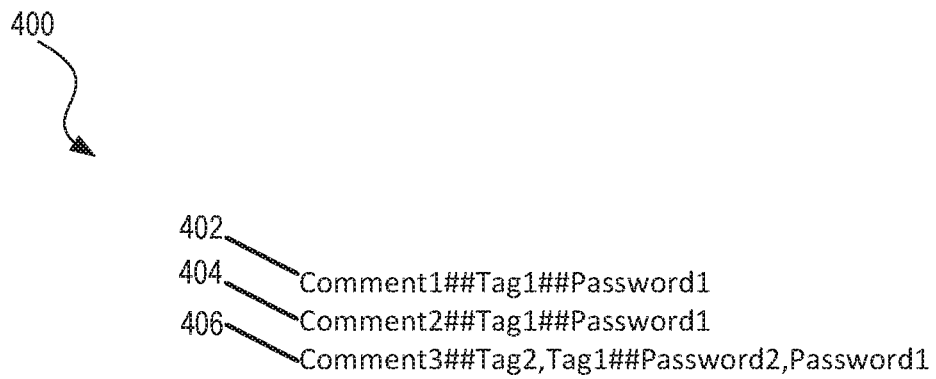
FIG. 4 is a data structure diagram illustrating a data structure for associating data corresponding to comments, tags, and passwords, in accordance with various examples of the present disclosure.

FIG. 4 illustrates a data structure 400 for associating data corresponding to comments, tags, and passwords, in accordance with various examples of the present disclosure.

In the present example, the data structure 400 is structured as a flat file. The data included in the file is structured by including delimiters, which in the present example are hash symbols and line breaks, but which may include other symbols in other examples.

In the present example, a first entry 402 in the data structure 400 includes a first text portion "Comment1##Tag1##Password1." Comment1 represents text of a first comment, Tag1 represents text of a first tag corresponding to the first comment, and Password1 represents a first password corresponding to the first comment and the first tag. As illustrated, the first comment, first tag, and first password are associated via a line break (e.g., the first comment, first tag, and first password are included in a same line). Further, the hash symbols "##" may be structured to separate the line into the first comment, first tag, and first password, such that a parser may identify the first comment, first tag, and first password.

Similarly, the data structure 400 includes a second entry 404 that includes a similar structure as the first entry 402. The second entry 404 includes a second comment, which is associated with the first tag, and the first password. With respect to the third entry 406, additional tag (e.g., "Tag2, Tag1") and password (e.g., "Password2, Password1") information may be specified to associate Comment3 with two tags and two passwords. In this example, a comma delimiter is included to separate the plurality of tags and the plurality of passwords corresponding to "Comment 3." The third entry 406 provides an example structure for associating comments with a plurality of tags and passwords.

While the entries illustrate a particular ordering of comment, tag, and password information, other examples may include other orderings and/or other delimiters that separate the comment, tag, and/or password data.

Figure 5:
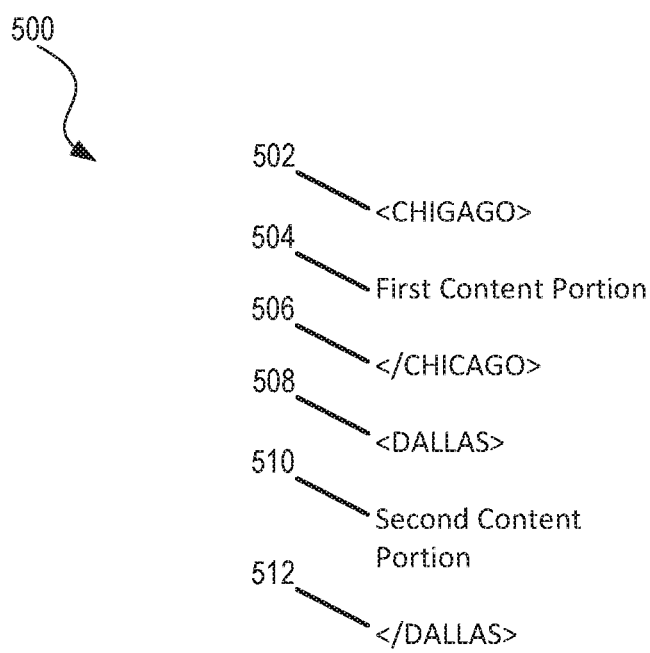
FIG. 5 is a data structure diagram illustrating a data structure for categorizing content, in accordance with various examples of the present disclosure.

FIG. 5 illustrates a data structure 500 for categorizing content, in accordance with various examples of the present disclosure.

In the present example, the data structure 500 is structured as a document that includes markup to provide structure to text included in the document. Markup includes keywords and/or special characters that may be parsed from the document. In some examples, text from the document is parsed and matched to one or more symbols and/or keywords to detect the markup.

In the present example, the markup provides tags corresponding to portions of the document. The document includes a tag "Chicago" that is provided by an opening tag 502 and a closing tag 506. Accordingly, the first content portion 504 that is within the opening tag 502 and tag 506 is tagged "Chicago." Similarly, the document includes a tag "Dallas" that is provided by an opening tag 508 and a closing tag 512. Accordingly, the second content portion 510 that is within the opening tag 508 and closing tag 512 is tagged "Dallas."

While in the present example the tags correspond to geographic location, in other examples there may be a variety of tags provided to categorize content portions. In some examples, the tags correspond to content genres or types. In some examples, content portions that are included within a same file or set of files may be referred to as content portions that are packaged into content payload. For example, the data structure 500 may be a content payload that includes the first content portion 504 and the second content portion 510 that are packaged into a same document/file. In the present example, the opening tag 502, the closing tag 506, and the first content portion 504 may be referred to as a first content portion. The opening tag 508, second content portion 510, and the closing tag 512 may be referred to as a second content portion.

Figure 6:
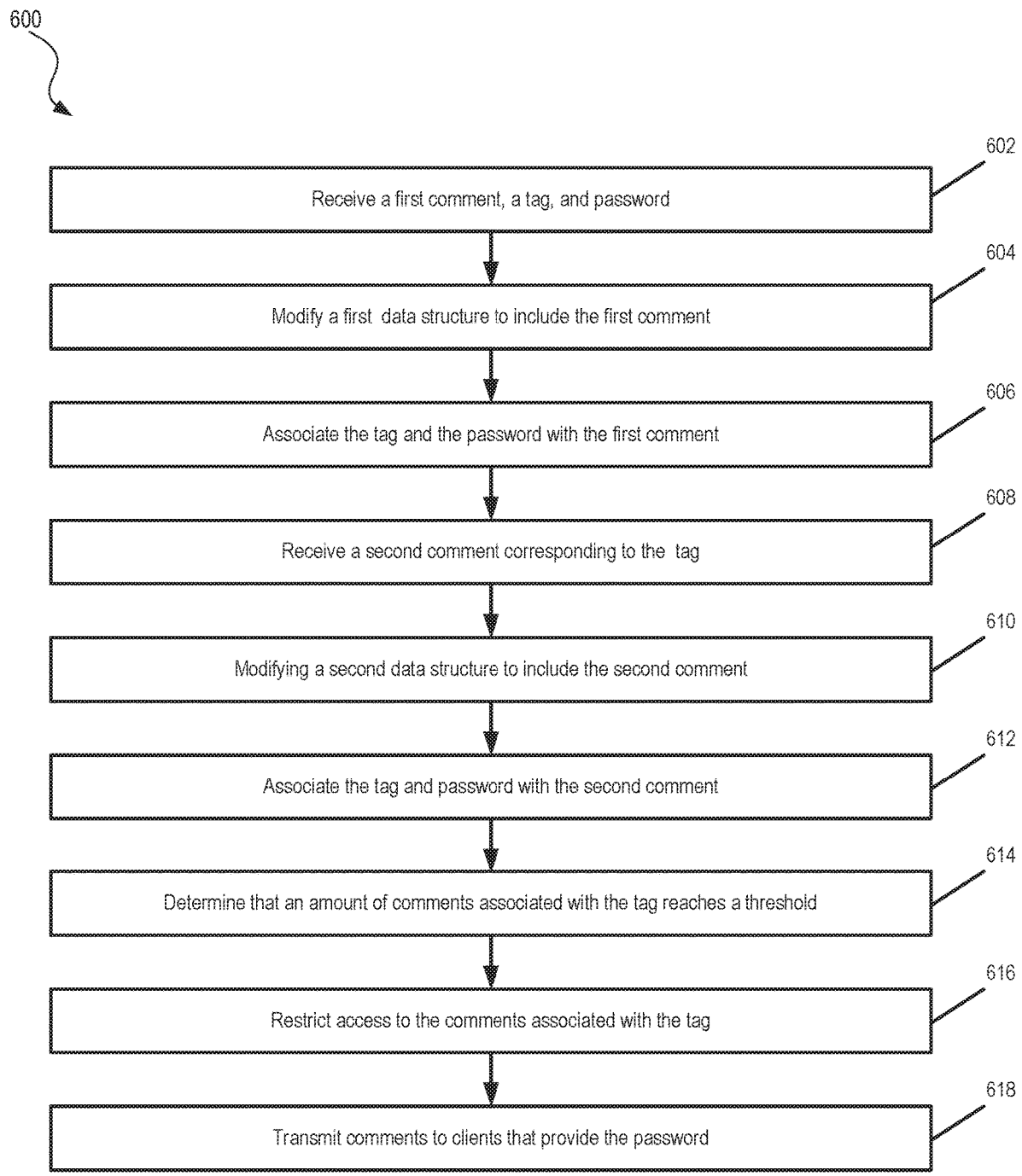
FIG. 6 is a flow diagram illustrating categorizing of content, in accordance with various examples of the present disclosure.

FIG. 6 illustrates categorizing of content, in accordance with various examples of the present disclosure. In some examples, the method 600 is implemented by one or more processors of the system architecture 100, by executing computer-readable instructions to perform the functions described herein. It is understood that additional steps can be provided before, during, and after the steps of method 600, and that some of the steps described can be replaced or eliminated in other examples of the method 600.

At action 602, a first comment, a tag, and a password are received at a computing device, which in the present example is referred to as a server. In the present example, the server receives the first comment, the tag, and the password from a client device. The server may be, for example, an online chat/discussion board provider.

In some examples, the first comment, tag, and password are input by a user of a client computing device via a single text entry that is delimited by special characters. In other words, a user may type in a text string that includes the first comment, a tag, and a password, where the first comment, tag, and password are separated by one or more delimiters. Delimiters may be special characters, such as hash tags, or other characters/text that are configured by the server to denote different portions of a text string. The server may parse the received text to identify the delimiters and separate the portions of the text entry into the first comment, the tag, and the password. However, in other examples, any of the first comment, tag, and/or password may be sent as a separate text string and/or in a separate communication.

At action 604, the server modifies a first data structure to include the first comment. For example, the first comment may be a string entry that is added to a database table, thereby modifying the database table data structure. In another example, modifying the first data structure may comprise adding the first comment as a line of a file. In some examples, modifying the first data structure also includes creating the data structure. For example, creating a data structure may include creating a database table, an entry in a database, a new file, a new data object, or creating some other data structure type.

At action 606, the received tag and password are associated with the first comment. In some examples, the tag and password are associated with the first comment by including the tag and password in a same data structure as the first comment. For example, the tag and password may be added to a same line of a document that includes the first comment. In another example, the tag and password may be added to a same database row. In another example, a tag variable and a password variable of a comment object may be modified to include the tag and password, respectively. These are merely some examples of associations that may be provided. In other examples, the tag and password may be associated with the first comment via other techniques.

At action 608, the server receives a second comment corresponding to the tag. The second comment may be received from the client computing device that originated the first comment or from another client computing device. In some examples, the second comment may explicitly include the tag. For example, the second comment and the tag may be included in a same text string that includes a delimiter to separate the second comment and the tag. In another example, the second comment may be inferred by the server to correspond to the tag. For example, the second comment may be a reply to the first comment, in which case the server may infer that the second comment corresponds to the same tag as the first comment.

At action 610, the server modifies a second data structure to include the second comment. For example, the second comment may be a string entry that is added to a database table, thereby modifying the database table data structure. In another example, modifying the second data structure may include adding the second comment to a file. In some examples, modifying the second data structure also includes creating the data structure. For example, creating a data structure may include creating a database table, an entry in a database, a new file, a new data object, or creating some other data structure type. In some examples, the first data structure is a same data structure as the second data structure. For example, the first comment and the second comment may be included in a same database table or file.

At action 612, the tag and password are associated with the second comment. In some examples, the tag and password are associated with the second comment by including the tag and password in a same data structure as the first comment. For example, the tag and password may be added to a same line of a document that includes the second comment. In another example, the tag and password may be added to a same database row. In another example, a tag variable and a password variable of a comment object may be modified to include the tag and password, respectively. These are merely some examples of associations that may be provided. In other examples, the tag and password may be associated via other techniques.

At action 614, the server determines that an amount of comments corresponding to the tag reaches a threshold. In some examples, reaching a threshold includes exceeding a preconfigured number of comments. In other examples, reaching a threshold includes exceeding or being equal to a preconfigured number of comments. In some examples, the threshold configured by a user. In the present example, the amount of comments includes a count of the comments that are associated with the tag. In some examples, the comments corresponding to the tag are dynamically determined, such as by querying one or more comment data structures and incrementing a counter for each located comment that is associated with the tag. In other examples, there is a counter variable corresponding to each tag that is incremented with each additional comment posted that is associated with the tag.

At action 616, access to the comments associated with the tag is restricted. In some examples, the restricting of the access is provided by requiring the password to access the comments. For example, a selecting of a restricted comment and/or tag may be responded to by the server providing the client with a password input and/or payment interface. Users may be asked to input the password prior to displaying comments associated with the tag or posting comments associated with the tag. In some examples, the password may be cached client-side and/or server-side for users that have provided the password, such that the users may continue to view and post comments associated with the tag without being asked to provide the password again.

In some examples, users that have accessed the comments associated with the tag prior to the threshold being reached may be provided the password. For example, a user that posts a comment that is associated with the tag and/or replies to a comment that is associated with the tag may be provided with the password. However, other users who have not posted and/or replied to comments associated with the tag may be unable to view and/or post comments associated with the tag after the threshold is reached. In some examples, these other users may be directed to a tag listing that shows an amount of comments that are associated with the tag, but may not be able to view the comments themselves. The users may be provided an option to purchase the password in order to access the comments associated with the tag.

At action 618, the access to the restricted comments may be provided to clients that provide the password to the server. For example, users of the clients may have purchased the password or have been provided the password for free based on posting comments associated with the tag prior to the threshold being reached.

Figure 7:
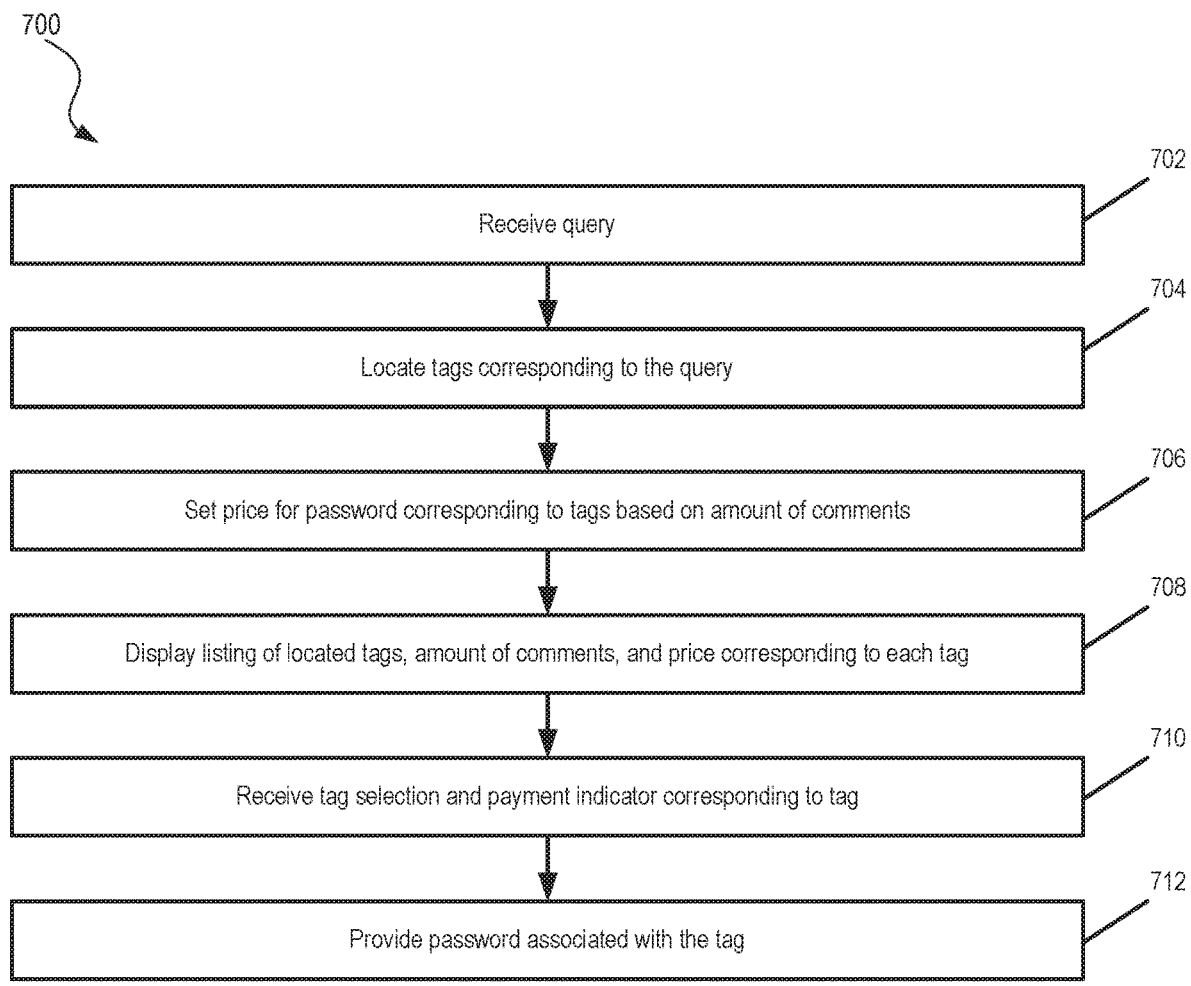
FIG. 7 is a flow diagram illustrating filtering of tagged content, in accordance with various examples of the present disclosure.

FIG. 7 illustrates filtering of tagged content, in accordance with various examples of the present disclosure. In some examples, the method 700 is implemented by one or more processors of the system architecture 100, by executing computer-readable instructions to perform the functions described herein. It is understood that additional steps can be provided before, during, and after the steps of method 700, and that some of the steps described can be replaced or eliminated in other examples of the method 700.

At action 702, a computing device such as a server receives a query from a client computing device. The query may include a search string that includes one or more keywords.

At action 704, the server locates tags corresponding to the query. In some examples, the locating includes parsing keywords from the query and matching keywords with one or more tags that are stored in a data store. Tags may be indexed to provide faster response to the search query. Locating may also include matching any wildcard or other special characters that are included in the query.

At action 706, a price is set to obtain the password corresponding to each tag. In the present example, the price is based upon an amount of comments associated with each tag. For example, if an amount of comments is below a first price threshold, access to the comments associated with the tag may be free. If the amount of comments is above the first price threshold, a preconfigured price may be set to access the comments associated with the tag. In some examples, there may be additional price thresholds at which the price is further increased as the amount of comments increases. For example, exceeding a first threshold may result in setting a first price and exceeding a second threshold that is higher than the first threshold may result in setting second price that is higher than the first price.

At action 708, tags that are located corresponding to the query may be sent from the server to the client and presented on a display of the client computing device. An indicator of an amount of comments that are associated with the tag may be displayed such that a user may determine the popularity of each located tag. For example, the indicator may be a number or icon that represents the amount of comments corresponding to the tag. In the present example, an indicator such as a value or icon corresponding to the price is also sent to the client such that the client may also present the price for accessing the comments associated with the tag.

At action 710, the server receives a selection of a tag from the client. If there is a price for accessing the tag, the server may provide the client with a payment request or direct the client to a payment processor. The server may receive a payment or an indicator that a payment was triggered, processed, and/or received. The payment indicator may be provided by a payment processing component of the server or from another computing device. For example, the payment indicator may include an indication that the client submitted a credit card payment and that the payment was authorized by a credit card company. In other examples, the payment indicator may include an indication that a payment was processed. In yet other examples, the payment indicator may include an indication that an account corresponding to the client has sufficient funds to cover the price. In yet other examples, the payment indicator may include a selection that is received that identifies that a user has agreed to pay the price for accessing the tag.

At action 712, the server provides the client with the password corresponding to the tag. In some examples, the password is transmitted to the client and the client inputs the password. In other examples, the server may identify the client as authorized to access the comments associated with the tag, or automatically input the password on the clients behalf, in order to provide access to the comments without transmitting the password to the client. Accordingly, once the client is provided the password, the client may access the comments with which the password is associated.

Figure 8:
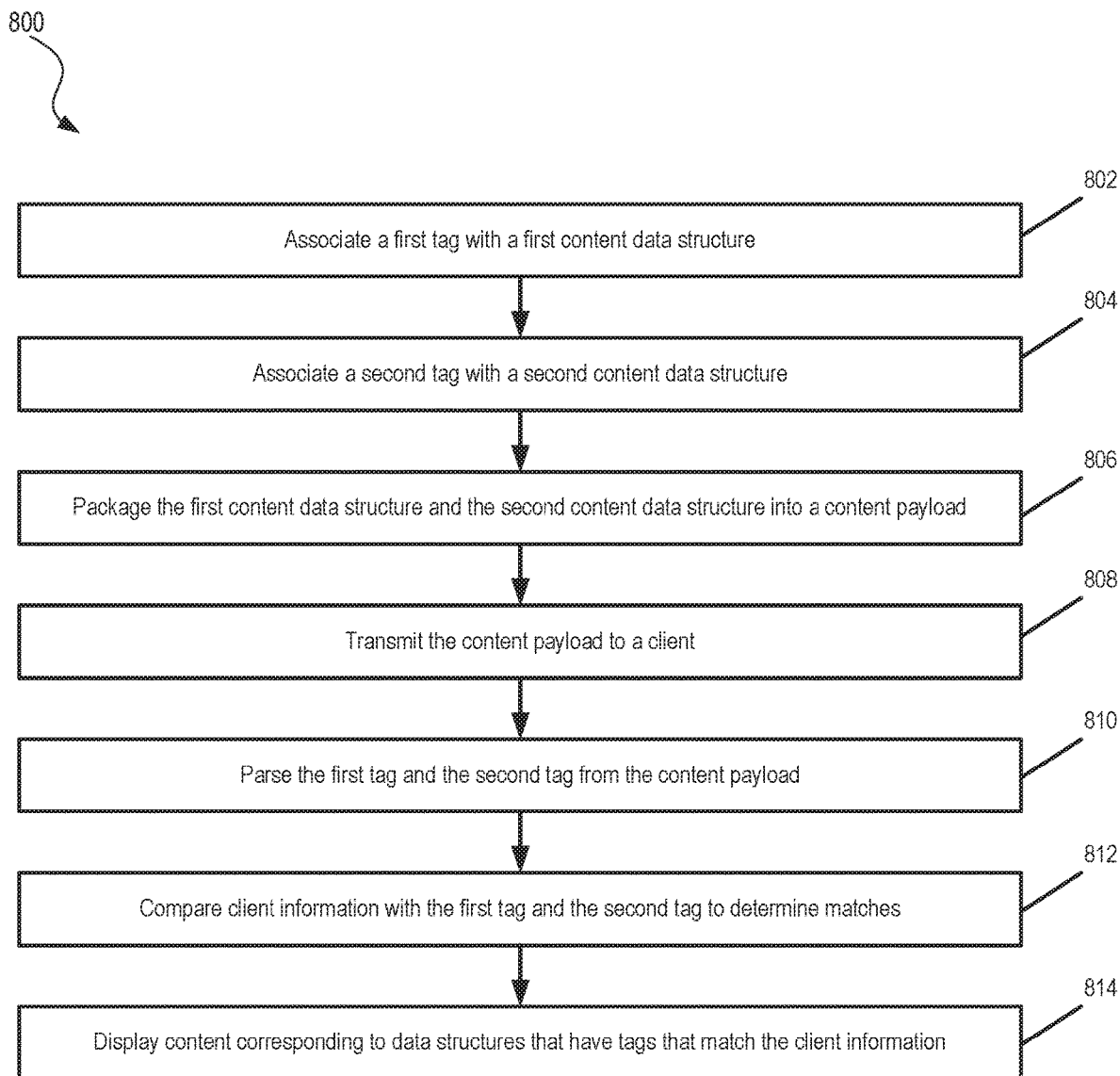
FIG. 8 is a flow diagram illustrating categorizing and filtering of content, in accordance with various examples of the present disclosure.

FIG. 8 illustrates categorizing and filtering of content, in accordance with various examples of the present disclosure. In some examples, the method 800 is implemented by one or more processors of the system architecture 100, by executing computer-readable instructions to perform the functions described herein. It is understood that additional steps can be provided before, during, and after the steps of method 800, and that some of the steps described can be replaced or eliminated in other examples of the method 800.

At action 802, a computing device, such as a server, associates a first tag with a first content data structure. The first content data structure may be, for example, a document or other file, a database table, portion of a file, or other data object that includes content. In some examples, the content included in the first content data structure is a comment, an article, a review, an advertisement, or other information. The first tag may be associated with the content included in the first content data structure in various ways. For example, the first tag may be inserted as markup language into a document that includes the content of the first content data structure. Accordingly, the first content data structure may comprise a portion of a file that includes the content and the first tag.

At action 804, a computing device, such as a server, associates a second tag with a second content data structure. The second content data structure may be, for example, a document or other file, a database table, portion of a file, or other data object that includes content. In some examples, the content included in the second content data structure is a comment, an article, a review, an advertisement, or other information. The content included in the second content data structure may be different than the content included in the first data structure. The second tag may be associated with the content included in the second content data structure in various ways. For example, the second tag may be inserted as markup language into a document that includes the content of the second content data structure. Accordingly, the second content data structure may comprise a portion of a file that includes the content and the second tag.

At action 806, the first content data structure and the second content data structure are packaged into a content payload. In some examples, the packaging includes compressing the first content data structure and the second data structure into a same compressed file. In other examples, the content of the first content data structure, the first tag, the content of the second content data structure, and the second tag may be included in a same document or other file type.

At action 808, the content payload is transmitted from the server to at least one client device.

At action 810, at the client device, the content payload is parsed to identify the first tag and the second tag. The parsing may be performed by a browser or other client-side application.

At action 812, the client compares client information with the parsed first tag and second tag to determine matches. For example, the client information may include location information, such as a location identifier, corresponding to the client or other preference information corresponding to the client. In some examples, the location is a geographic location or an internet address. In other examples, the client information includes one or more client preferences that are provided by one or more users of the client. For example, client preferences may indicate particular genres of content, specified by a genre identifier, in which a user is interested. The client information may be structured as one or more keywords that may be matched to the tags.

In some examples, the client information is dynamically determined, such as by dynamically retrieving an internet address or other location information of the client. In other examples, the client information may be stored in a local cache, browser cookie, or other data storage structure that is accessible to the client. In some examples, the client information is input by one or more users. In other examples, the client information is determined based on monitoring computing activity, such as by monitoring internet browsing activities. Accordingly, the client information may be provided by retrieving the client information from a data structure on the client or by interactively having a user input the client information at a time when the content payload is processed.

At action 814, for each tag that matches the client information, content associated with the tag is presented on a display of the client. For example, client information may include a keyword that identifies a first location. The keyword may match the first tag, but not match the second tag. Accordingly, the content corresponding to the first content data structure may be presented on the client device, and the content corresponding to the second content data structure may not be presented on the client device. Thus, the content payload may be transmitted to a plurality of clients, which may present particular content from the content payload based on client information, such as location and/or other preference information. In other words, a first client may present to a user a first content portion from the content payload, and a second client may present to a user a second content portion from the content payload, thereby customizing the presentation of the content payload on each client device.

In other examples, as discussed further with respect to FIG. 7, the content and/or tags may be associated with passwords, which may be matched to passwords provided by client devices to access the content. Further, a computing device, such as a server, may manage access to the passwords and provide the passwords as discussed with respect to FIG. 7.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
   a non-transitory memory storing one or more data structures; and
   one or more hardware processors coupled to the non-transitory memory and configured to execute instructions to cause the system to perform operations comprising:
   obtaining a first comment submitted to a first website by a first user device of a first user;
   deriving a tag associated with the first comment;
   determining that a number of comments in a plurality of comments associated with the tag has exceeded a threshold, wherein the plurality of comments comprises at least the first comment and a second comment submitted to a second website by a second user device of a second user; and
   in response to determining that the number of comments in the plurality of comments associated with the tag has exceeded the threshold, modifying an access level associated with the plurality of comments.

2. The system of claim 1, wherein the modifying the access level comprises associating a password with the plurality of comments.

3. The system of claim 2, wherein the operations further comprise:
   receiving, from a third user device of a third user, a request to access one or more comments from the plurality of comments;
   determining whether the password is included or associated with the request; and
   providing the third user access to the one or more comments in response to determining that the password is included or associated with the request.

4. The system of claim 2, wherein the operations further comprise:
   receiving, from a third user device of a third user, a request to access one or more comments from the plurality of comments;
   determining whether the password is included or associated with the request; and
   denying the third user access to the one or more comments in response to determining that the password is not included or associated with the request.

5. The system of claim 1, wherein the modifying the access level associated with the plurality of comments comprises associating a monetary amount to the plurality of comments.

6. The system of claim 5, wherein the operations further comprise:
   receiving, from a third user device of a third user, a request to access one or more comments from the plurality of comments;
   initiating a payment process with the third user based on the monetary amount; and
   providing the third user access to the one or more comments in response to completing the payment process.

7. The system of claim 5, wherein the operations further comprise determining the monetary amount based on the determined number of comments in the plurality of comments.

8. A method, comprising:
   detecting, by one or more hardware processors, that a first comment has been posted on a first website by a first user device of a first user;
   deriving a tag associated with the first comment based on at least one of content of the first comment or a relationship between the first comment and a second comment posted on the first website;
   receiving, from a second user device of a second user, a request for accessing one or more comments associated with the tag;
   determining a number of comments in a plurality of comments associated with the tag, wherein the plurality of comments comprises at least the first comment and a third comment posted on a second website by a third user device of a third user; and
   determining, by the one or more hardware processors for the request, a security policy for accessing the one or more comments associated with the tag based on the determined number of comments.

9. The method of claim 8, further comprising:
   determining whether the number of comments has exceeded a first threshold, wherein the security policy is determined to require the second user to provide a payment in a first amount based on determining that the number of comments has exceeded the first threshold.

10. The method of claim 9, further comprising:
determining whether the number of comments has exceeded a second threshold higher than the first threshold; and
in response to determining that the number of comments has exceeded the second threshold, modifying the security policy to require the second user to provide the payment in a second amount higher than the first amount.

11. The method of claim 9, further comprising determining the first amount based on the first threshold and the tag.

12. The method of claim 9, further comprising:
initiating a payment process with the second user based on the first amount; and
providing the second user access to the one or more comments associated with the tag in response to completing the payment process.

13. The method of claim 9, further comprising:
initiating a payment process with the second user based on the first amount;
determining that the payment process has failed to complete; and
denying the second user access to the one or more comments associated with the tag in response to the determining that the payment process has failed to complete.

14. The method of claim 8, further comprising:
determining whether the number of comments has exceeded a threshold, wherein the security policy is determined to require the second user to provide a password based on the determining that the number of comments has exceeded the threshold.

15. A non-transitory machine-readable medium having stored thereon machine-readable instructions executable to cause a machine to perform operations comprising:
detecting that a first comment has been posted on a first website by a first user device of a first user;
deriving a topic associated with the first comment;
determining that a number of comments in a plurality of comments associated with the topic has exceeded a threshold, wherein the plurality of comments comprises at least the first comment and a second comment posted on a second website by a second user device of a second user; and
determining an access level associated with the plurality of comments based on the determined number of comments.

16. The non-transitory machine-readable medium of claim 15, wherein the determining the access level comprises associating a password with the plurality of comments.

17. The non-transitory machine-readable medium of claim 16, wherein the operations further comprise:
receiving, from a third user device of a third user, a request to access one or more comments from the plurality of comments;
determining whether the password is included or associated with the request; and
providing the third user access to the one or more comments in response to determining that the password is included or associated with the request.

18. The non-transitory machine-readable medium of claim 16, wherein the operations further comprise:
receiving, from a third user device of a third user, a request to access one or more comments from the plurality of comments;
determining whether the password is included or associated with the request; and
denying the third user access to the one or more comments in response to determining that the password is not included or associated with the request.

19. The non-transitory machine-readable medium of claim 15, wherein the determining the access level associated with the plurality of comments comprises associating a monetary amount to the plurality of comments.

20. The non-transitory machine-readable medium of claim 19, wherein the operations further comprise determining the monetary amount based on the determined number of comments in the plurality of comments.

* * * * *